Oct. 2, 1928.
A. B. NIHLROS
1,686,168
SPRING WHEEL
Filed March 24, 1927
3 Sheets-Sheet 2
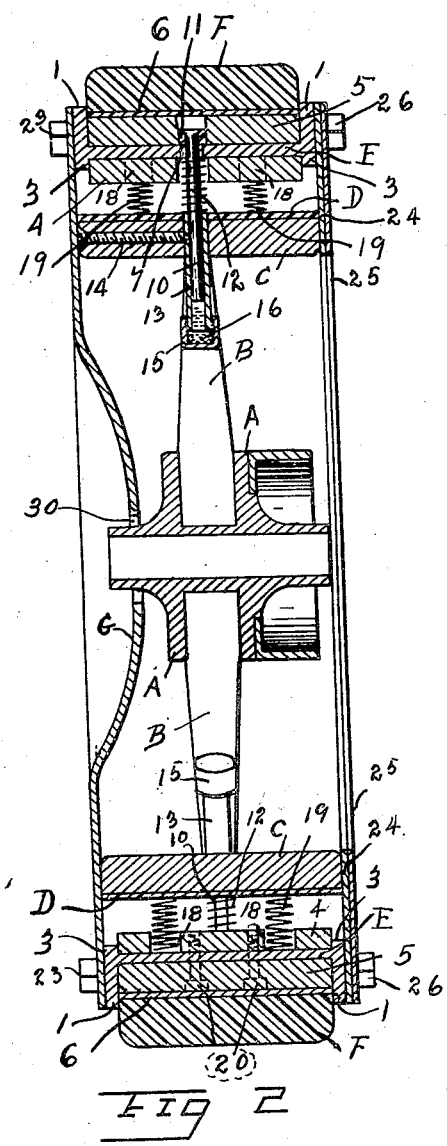
FIG 2
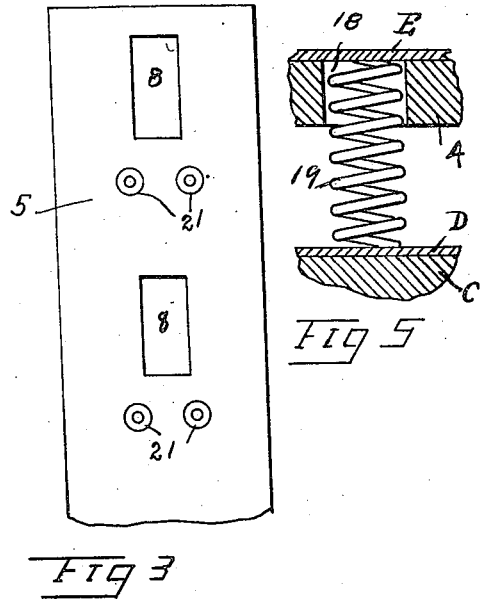
FIG 5
FIG 3
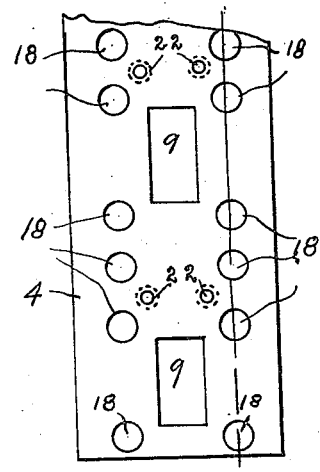
FIG 4
Andrew B Nihlros
INVENTOR.
BY F. L. Horspool
ATTORNEY.

Oct. 2, 1928.

A. B. NIHLROS 1,686,168

SPRING WHEEL

Filed March 24, 1927     3 Sheets-Sheet 3

Andrew B. Nihlros
*INVENTOR.*

BY F. L. Horspool
*ATTORNEY.*

Patented Oct. 2, 1928.

1,686,168

UNITED STATES PATENT OFFICE.

ANDREW B. NIHLROS, OF MURRAY CITY, UTAH.

SPRING WHEEL.

Application filed March 24, 1927. Serial No. 177,897.

This invention relates to an improvement in a spring-wheel, and has for one of its objects, to provide a spring-wheel of maximum strength and durability wherein the desired resiliency is obtained through the employment of a plurality of radially arranged coil springs.

Another object of this invention is to provide a spring-wheel with a particular form of rim section composed of a plurality of connected rings, two of which are constructed in sections so they can be placed on the other ring, and the other ring has flanges thereon projecting in such a manner to answer as a guide for the two rings, one of said rings acts as a retainer for a plurality of retaining bolts and the other of said rings acts as a retainer for a plurality of coil springs.

Another object of this invention is to provide a simply constructed spring-wheel and a very simple effective means for supplying a cushion upon the wheel hub by a plurality of coil springs, adding more springs for a heavy load and removing springs for a light load.

Another object of this invention is to provide a spring-wheel to obviate the use of pneumatic tires on automobiles and other vehicles.

Another object of this invention is to provide a spring-wheel with a rim or tire support provided with retaining bolts for holding said rim to the wheel felly, each of said bolts having a coil spring thereon. The inner ends of the retaining bolts each slide within a cylinder which is secured within the felly of the wheel in such a manner so the center portion may yield with respect to the rim portion when meeting irregularities or obstructions. The retaining bolts are so arranged within the rim portion to permit relative displacement of the rim which is resisted by coil springs which receive shocks or jars transmitted by the vehicle carried by the wheels.

The invention consists of a rigid resistant construction as far as the mechanical details of the wheel is concerned, and since parts of the wheel rest upon other parts, provision is made for reducing friction loss to a minimum.

With these and other objects in view the invention consists of certain novel features of construction as hereinafter fully described and claimed.

In the accompanying drawing forming a part of this specification and in which corresponding parts are denoted by like reference characters, is illustrated the preferred form of embodiment of the invention capable of carrying the same into practical operation, it being understood that the invention is not necessarily limited thereto, as various changes in the shape, proportions and general assemblage of the parts may be resorted to without departing from the principles of the invention or sacrificing any of its advantages, and the right is therefore reserved for making all the changes and modifications which will fairly fall within the scope of the invention and the claims made therefor.

Referring to the drawing—

Figure 1 is a front view of the invention showing part of wheel casing G cut away to show the wheel, with felly, rim, inner rim, outer rim, center rim and tire in section.

Fig. 1$^A$ is an enlarged sectional view of one of the retaining bolts and its parts.

Fig. 2 is a view on line 2—2 Fig. 1.

Fig. 3 is a fragmentary plan view of the outer rim 5.

Fig. 4 is a fragmentary plan view of inner rim 4.

Fig. 5 is a fragmentary section of center rim, inner rim and felly showing a spring 19 in place.

Figure 1:
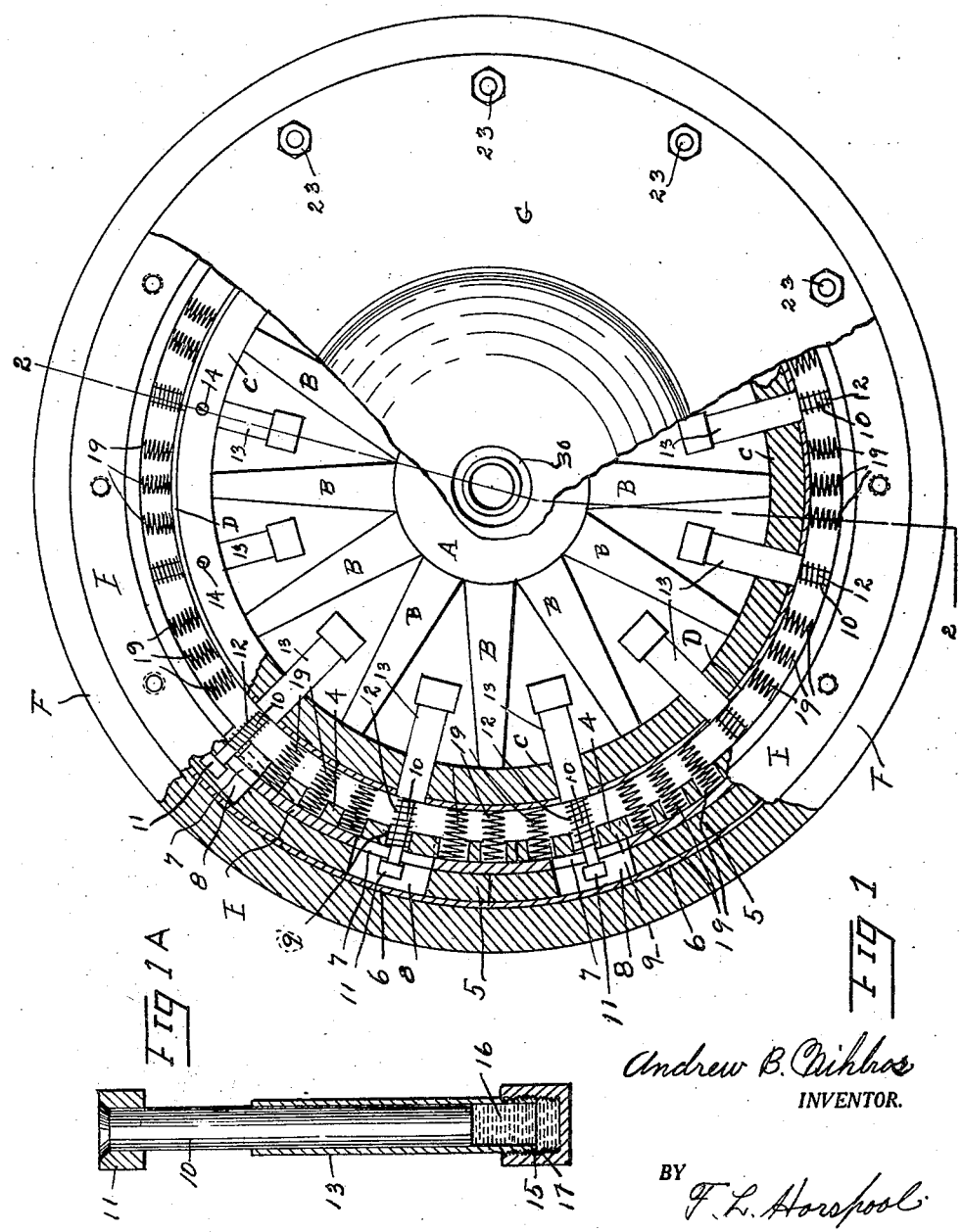
Figure 6:
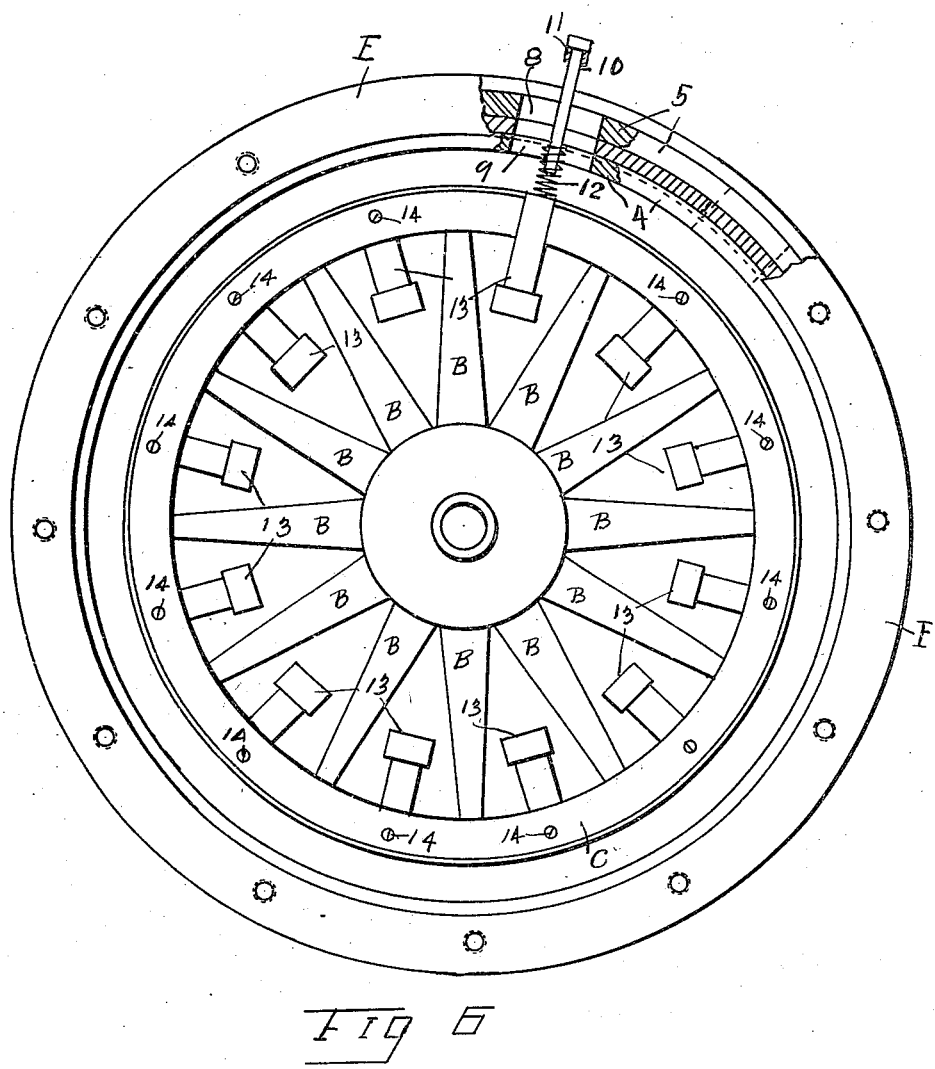
Fig. 6 is a side view partly broken away and partly in section of the invention as it will appear in starting to assemble the same.

The invention comprises a wheel having a hub A with radial extending spokes B, a felly C connecting said spokes. Over the felly C is placed a band or tire D. A rim E is spaced from the felly C having flanges 1 and 3 thereon. One pair of the flanges project outwardly and the other pair of said flanges project inwardly. Inward of rim E and between the flanges 3 is placed an inner rim 4 which is in sections so it can be placed therein. The rim 4 has a plurality of pockets 18 therein each for receiving one end of a spring 19. In the rim 4 are a plurality of rectangular slots 9 through which pass retaining bolts 10. The other end of each spring 19 rests upon felly band D.

Placed on the outer face of rim E is another or outer rim 5 which is disposed between flanges 1 and is in sections so it can be placed therein. A plurality of rectangular slots 8 are in the rim in each of which is placed collar 11 of retaining bolt 10.

The rims E, 4 and 5 are secured together by bolts 20 passing through holes 21 and corresponding holes in rim E and then threaded into holes 22 of inner rim 4.

The retaining bolts 10 and collars 11 are now placed into slots 8 the inner end of the bolt projecting through a slot 7 in rim E and slot 9 in rim 4 and through spring 12. The inner end of retaining bolt is now placed into a cylinder 13 which is secured within felly C by a bolt 14.

On the inner end of cylinder 13 is a cap 15 which is secured thereon by a thread 17. This cap is removed to fill the inner end of the cylinder with grease 16 to lubricate the bolt 10 and what grease may have worked out of the outer end of the cylinder will lubricate the spring 12.

On the front of the wheel is placed a cover G which is secured to the center rim E by bolts 23. In the center of the cover is an opening 30 which gives clearance for the hub in the operation of the wheel.

On the back of the wheel is placed a dust guard 24 which is held in place by a ring 25 which in turn is secured to the rim E by bolts 26.

Band 6 is now placed over rim 5 and the tire F is then placed onto the band in the usual manner.

Having described the parts of my invention what I claim as new and desire to secure by Letters Patent, is:

1. In a spring-wheel the combination with a hub having spokes projecting therefrom and a felly connecting said spokes together, said felly having a band on its outer face, of cylinders secured within said felly, a rim spaced from said felly, an inner rim in sections between said felly and said rim, said inner rim being provided with means for retaining a plurality of coil springs, one end of said springs resting against said rim and the other end of said springs resting upon said band, all substantially as set forth.

2. In a spring-wheel in combination with a hub having spokes projecting therefrom and a felly connecting said spokes together, said felly having a band on its outer face, a rim spaced from said felly, springs between said felly and rim, said rim being provided with retaining means therefor, an outer rim on said rim made in sections, said outer rim being provided with means for retaining a plurality of collars, an inner rim and means for securing said rim, outer rim and inner rim together, all substantially as described.

3. In a spring-wheel in combination with a hub having spokes projecting therefrom and a felly for securing said spokes together, said felly having a band on its outer face, cylinders secured within said felly, a rim spaced away from said felly, an inner rim between said rim and felly, springs placed between said felly and inner rim, one end of said springs resting on said felly band and the other end of said springs resting in openings in said inner rim all substantially as set forth.

4. In a spring-wheel in combination with a hub having spokes projecting therefrom and a felly connecting said spokes together, cylinders secured within said felly, a rim spaced away from said felly, an inner rim between said rim and felly, springs between said rim and felly, said inner rim being provided with means for securing said springs between said rim and felly, an outer rim resting between flanges on said rim, means for securing all of said rims together, a plurality of retaining bolts, each said retaining bolt passing through its slot in all of said rims, said retaining bolt passing through a coil spring, the inner end of said retaining bolt entering one of said cylinders all substantially as set forth.

5. In a spring-wheel in combination with a hub having spokes projecting therefrom and a felly connecting said spokes, cylinders secured within said felly, a rim spaced away from said felly, an inner rim between said rim and felly, coil springs between said rim and felly, said inner rim being provided with means for securing said coil springs in their relative places, an outer rim resting between flanges on said rim, a plurality of retaining bolts, all of said rims being provided with means whereby said retaining bolts can be passed from said outer rim to said cylinders and means for securing all of said rims together all substantially as set forth.

ANDREW B. NIHLROS.